P. FARB.
TALKING MACHINE.
APPLICATION FILED APR. 4, 1918.
1,409,369.
Patented Mar. 14, 1922.
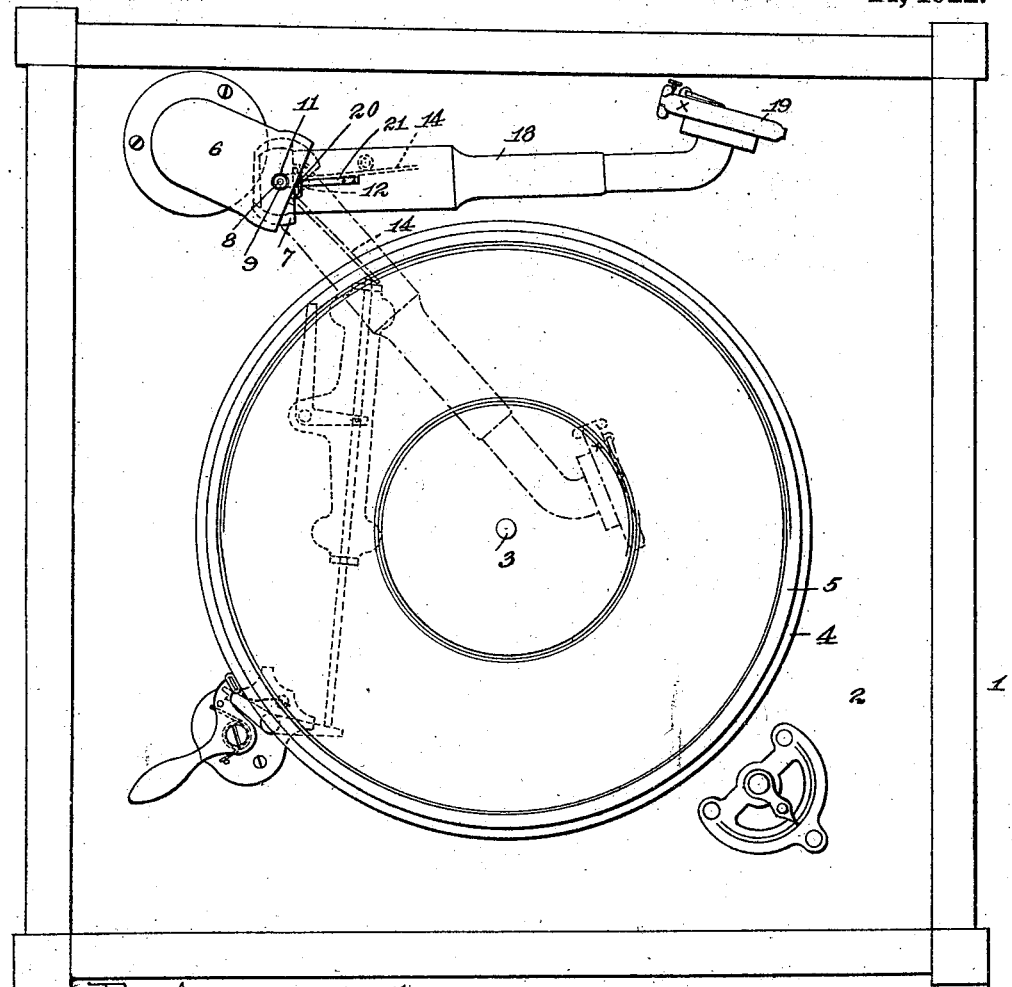
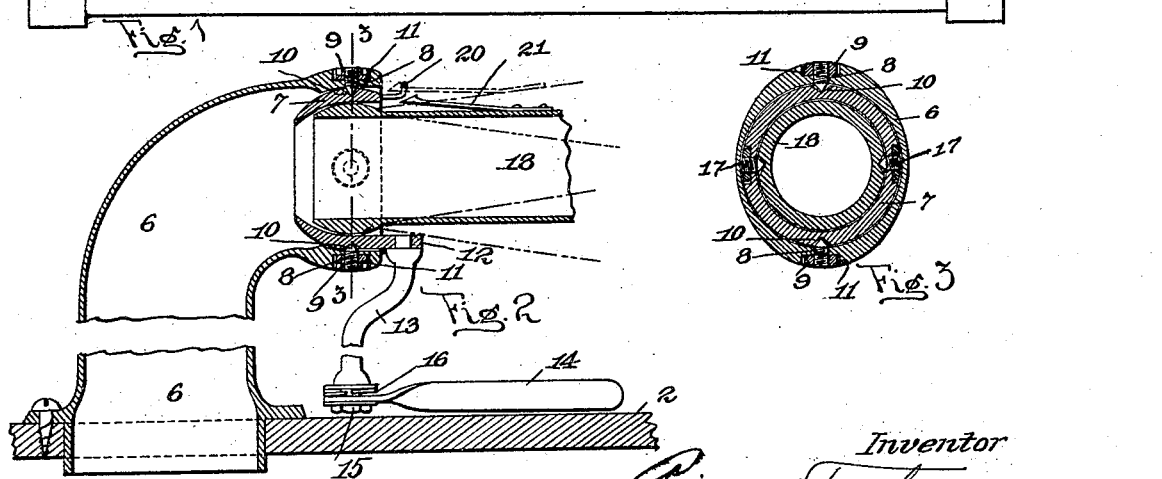
Inventor
Pincus Farb
by Schechter & Sokel
his Attorneys

UNITED STATES PATENT OFFICE.

PINCUS FARB, OF SAGINAW, MICHIGAN, ASSIGNOR TO SONORA PHONOGRAPH CORPORATION, A CORPORATION OF NEW YORK.

TALKING MACHINE.

1,409,369.  Specification of Letters Patent.  Patented Mar. 14, 1922.

Application filed April 4, 1918. Serial No. 226,762.

*To all whom it may concern:*

Be it known that I, PINCUS FARB, a citizen of the United States, and a resident of the city of Saginaw, county of Saginaw, State of Michigan, have invented a new and useful Improvement in Talking Machines, of which the following is a specification.

My invention relates to talking machines of the disc record type and has for its object, to provide a device which will be simple and economical of construction, the movable part of which will be light in weight in order that it may not impose too great amount of drag on the reproducing stylus.

A further object is to provide means carried by the tone-arm for operating an automatic stop for arresting the movement of the turntable.

A further object is to provide a lock whereby the tone-arm is raised to release the stylus from engagement with the record groove and may be retained in such position.

A further object of the invention is the provision of means carried by the tone-arm for operating the automatic stop, which are effective and positive in its respective actions.

A further object of the invention is the provision of means of the character herein described, which are extremely simple in construction, neat and attractive in appearance, not liable to get out of order, thoroughly reliable and efficient in its purpose, and inexpensive and economical to manufacture.

With these and other objects in view to be more fully set forth hereinafter, the invention consists in the novel construction, combination of elements, and arrangements of parts which will be exemplified in the construction hereinafter described in the specification and illustrated in the accompanying drawings considered together or separately.

The inventive idea involved is capable of receiving a variety of mechanical expressions, one of which for the purpose of illustrating the invention, is shown in the accompanying drawings.

The invention will be first described in connection with the accompanying drawings, wherein similar reference characters are used to designate corresponding parts throughout the several views, and then more specifically defined and indicated in the appended claims.

In the drawings,—

Fig. 1 is a plan view of a talking machine embodying my invention.

Fig. 2 is a detail sectional view of a portion of the tone-arm; and

Fig. 3 is a transverse section on the line 3—3 of Fig. 2.

In carrying out my invention I provide a cabinet 1 having a motor board 2 to the underside of which a motor (not shown) is secured. The turn-table spindle 3 of the motor projects through the motor board and carries a turn-table 4, on which is a record disc 5 rests.

Arranged on the motor board and to one side of the turn-table is a hollow elbow tube 6 forming part of a tone-arm and passes through the motor board and communicates with a sound-amplifying device (not shown) arranged below the motor board. The elbow tube 6 is rigidly secured to the motor board by means of screws or other fastening means.

One arm of the elbow tube is horizontal and lies substantially parallel to the motor board and is turned toward the turn-table, and to which elbow is connected the tone-arm capable of having both a horizontal and vertical movement. Pivoted within one end of the elbow tube is a gimbal ring 7. The gimbal is so pivoted on vertical diametrically opposite points 8 that it may swing in a plane parallel to the plane of the motor board. The points 8 are threaded into the elbow tube and a lock nut 9 is provided for each point. The points 8 engage sockets 10 in the elbow tube. The lock nuts 9 are fitted in recesses 11 in the elbow in order that they and the points 8 will be flush with and not project beyond the surface of the elbow tube.

A lug or projection 12 projects from and is carried on the lower portion of the gimbal ring 7 and a rearwardly bent post 13 is rigidly secured to the lug or projection. The post is bent backward so as to be in vertical alinement with the points 8. The post extends downward towards the motor board, and its lower end carries a lever 14 adapted to engage a movable element fixed to the motor board under the turn-table and forming part of an automatic stop. I have illustrated the arm 14 cooperating with an automatic stop mechanism, illustrated in the patent of Frank Malocsay, No. 1,383,651, granted July 5, 1921, but the automatic stop forms no part of my invention.

The arm 14 is secured to the bottom of the post by means of a nut 15, and a spring washer 16 is interposed between the arm and the bottom of the post in order that the arm may be readily moved relatively to the post.

Mounted on diametrically opposite pivot points 17 in the gimbal ring is the inner end of a tone-arm member 18, the outer end of which supports a sound box or reproducer 19. The pivot points 17 are fixed to the gimbal ring 7 in a similar manner as the points 8 are in the elbow tube. The inner end of the tone-arm member 18 is spherical, as is the gimbal ring, to allow for movement of those elements relatively to each other.

A bar or loop 20 is secured to the gimbal ring at a point above the tone-arm and substantially diametrically opposite the lug 12, and a spring arm 21 is fixed to and carried by the tone-arm member 18 and is provided with a hooked end adapted to engage the bar when the tone-arm is raised to lock the tone-arm in raised position and to be yieldably disengaged therefrom when the tone-arm is lowered to operative position.

Great advantage is attributed to the fact that the bent post 13 is secured to the horizontally swinging lug or projection 12, in that it allows of greater vertical movement of the tone-arm independently of the lug or projection and its attached arm, which would be impossible if the bent post 13 was affixed directly to the tone-arm, as the arm 14 attached to the post and extending under the turntable would prevent the raising of the tone-arm, as the arm would come in contact with the underside of the turn-table 4. With the bent post attached to the horizontal portion of a tone-arm, it would be impossible to secure the necessary amount of vertical movement so as to retain the tone-arm in the proper raised position and out of contact with the record disc when required.

Another advantage in having the bent post 13 secured to the lug 12 is the fact that the action of the stop is much more effective and positive than a device in which the arm 14 is clamped to the tubular elbow portion 6; as in such a structure, the arm 14 by reason of its clamping member which allows for relative movement in relation to the member 6, and by reason thereof, there is a tendency in the device to be inaccurate. Whereas with a device as herein described, where the arm 14 is affixed directly to the horizontally swinging lug 12 through the bent post 13, the action is much more effective and positive.

The operation of the device is obvious from the above description and accompanying drawings.

In accordance with the provisions of the patent statutes, I have described the principle of my invention together with the apparatus which I now consider to represent the best embodiment thereof, but I desire it understood that my invention is not confined to the particular form of apparatus herein shown and described, the same being merely illustrative, and that the invention can be carried out in other ways without departing from the spirit of my invention, and, therefore, I claim broadly the right to employ all equivalent instrumentalities coming within the scope of the appended claims, and by means of which objects of my invention are attained, and the new results accomplished, as herein set forth, as it is obvious that the particular embodiment herein shown and described is only one of many that can be employed to attain these objects and accomplish these results.

Having now described my invention, what I claim and desire to secure by Letters Patent is as follows:

1. In a talking machine, a cabinet having a motor-board, a turn-table mounted upon said motor-board, an automatic stop for said turn-table, means for operating said stop fixed to the motor board and located entirely beneath said turn-table, a tubular elbow rigidly fixed to said motor-board, a gimbal ring pivotally mounted in said elbow to swing horizontally therein, a tone-arm pivotally mounted in said gimbal ring to swing vertically therein, and an arm fixed to and carried by said gimbal ring and extending under the turn-table when the tone-arm is in operative position and adapted to engage the automatic stop operating means to release the stop.

2. In a talking machine, a cabinet having a motor-board, a turn-table mounted upon said motor-board, an automatic stop for said turn-table, means for operating said stop fixed to the motor board and located entirely beneath the turn-table, a tubular elbow rigidly fixed to said motor-board, a gimbal ring pivotally mounted in said elbow to swing horizontally therein, a tone-arm pivotally mounted in said gimbal ring to swing vertically therein, a post fixed to and carried by said gimbal ring and extending toward the motor-board, and an arm fixed to and carried by the lower end of said post and extending under the turn-table when the tone-arm is in operative position and adapted to engage the automatic stop operating means to release the stop.

3. In a talking machine, a cabinet having a motor-board, a turn-table mounted upon said motor-board, an automatic stop for said turn-table, means for tripping said stop fixed to the motor board and located entirely beneath the turn-table, a tubular elbow rigidly fixed to said motor-board, a gimbal ring pivotally mounted in said elbow to swing horizontally therein, a lug projecting from said gimbal ring, a tone-arm pivotally mounted in said gimbal ring to swing vertically therein, a post fixed to and carried by the lug on said gimbal ring and extending toward the motor board, and an arm fixed to and carried by the lower end of said post and extending under the turn-table when the tone-arm is in operative position and adapted to engage the automatic stop tripping means to release the stop.

4. In a talking machine, a cabinet having a motor-board, a turn-table mounted upon said motor board, an automatic stop for said turn-table, means for tripping said stop fixed to the motor board and located entirely beneath the turn-table, a tubular elbow rigidly fixed to said motor-board, a gimbal ring pivotally mounted in said elbow to swing horizontally therein, a lug projecting from said gimbal ring, a tone-arm pivotally mounted in said gimbal ring to swing vertically therein, a post fixed to and carried by the lug on said gimbal ring and extending toward the motorboard, and an arm adjustably fixed to and carried by the lower end of said post and extending under the turn-table when the tone-arm is in operative position and adapted to engage the automatic stop tripping means to release the stop at any predetermined point in the record being reproduced.

5. In a talking machine, a cabinet having a motor-board, a turn-table mounted upon said motor-board, an automatic stop for said turn-table, means for tripping said stop fixed to the motor board and located entirely beneath the turn-table, a tubular elbow rigidly fixed to said motor-board, a gimbal ring pivotally mounted in said elbow to swing horizontally therein, a lug projecting from said gimbal ring, a tone-arm pivotally mounted in said gimbal ring to swing vertically therein, a post fixed to and carried by the lug on said gimbal ring and extending toward the motor-board, and an arm adjustably fixed to and carried by the lower end of said post and extending under the turn-table when the tone-arm is in operative position and adapted to engage the automatic stop tripping means to release the stop at any predetermined point in the record being reproduced, the said tone-arm being adapted to be swung vertically independently of the gimbal ring and its attached stop tripping arm to raise said tone-arm to inoperative position, and means for holding the tone-arm in elevated position.

This specification signed and witnessed this 27th day of March, 1918.

PINCUS FARB.

Witnesses:
M. A. CARPELL,
E. E. SPECKHARD.